(12) United States Patent
Pimpinella et al.

(10) Patent No.: US 12,185,037 B2
(45) Date of Patent: Dec. 31, 2024

(54) OPTICAL INTERCONNECTION MODULE ASSEMBLY FOR SPINE-LEAF NETWORK SCALE-OUT

(71) Applicant: Panduit Corp., Tinley Park, IL (US)

(72) Inventors: Richard J. Pimpinella, Prairieville, LA (US); Jose M. Castro, Naperville, IL (US)

(73) Assignee: Panduit Corp., Tinley Park, IL (US)

(*) Notice: Subject to any disclaimer, the term of this patent is extended or adjusted under 35 U.S.C. 154(b) by 144 days.

(21) Appl. No.: 18/104,539

(22) Filed: Feb. 1, 2023

(65) Prior Publication Data

US 2024/0259717 A1    Aug. 1, 2024

(51) Int. Cl.
*H04B 10/00*    (2013.01)
*H04Q 11/00*    (2006.01)
*H04J 14/00*    (2006.01)

(52) U.S. Cl.
CPC ..... *H04Q 11/0071* (2013.01); *H04Q 11/0005* (2013.01); *H04Q 2011/0007* (2013.01); *H04Q 2011/0086* (2013.01); *H04Q 2011/009* (2013.01)

(58) Field of Classification Search
CPC ... H04Q 2011/0052; H04Q 2011/0054; H04Q 2011/0056
See application file for complete search history.

(56) References Cited

U.S. PATENT DOCUMENTS 9,154,860 B2    10/2015  Hessong et al.
2021/0033795 A1*  2/2021  Lohmann .......... H04Q 11/0005
2021/0058685 A1*  2/2021  Frankel .............. H04Q 11/0066

* cited by examiner

*Primary Examiner* — Daniel G Dobson
(74) *Attorney, Agent, or Firm* — Christopher K. Marlow; Christopher S. Clancy; James H. Williams

(57) ABSTRACT

An optical interconnection assembly for a Spine-and-Leaf network is disclosed. The optical interconnection assembly has Spine multi-fiber optical connectors and Leaf multi-fiber optical connectors. The Spine optical connectors of the interconnection assembly are optically connected to multi-fiber connectors of Spine switches via Spine patch cords. The leaf multi-fiber connectors are optically connected to Leaf multi-fiber connectors of Leaf switches via Leaf patch cords. An array of simplex fiber optic cables in said interconnection assembly serve to optically connect every Spine multi-fiber connector to every Leaf multi-fiber connector so that every Spine switch is optically connected to every Leaf switch. The optical interconnection assembly facilitates network Spine-and-Leaf interconnections and the ability to scale-out the network by installing additional assemblies, Leaf switches, and Spine switches.

19 Claims, 10 Drawing Sheets

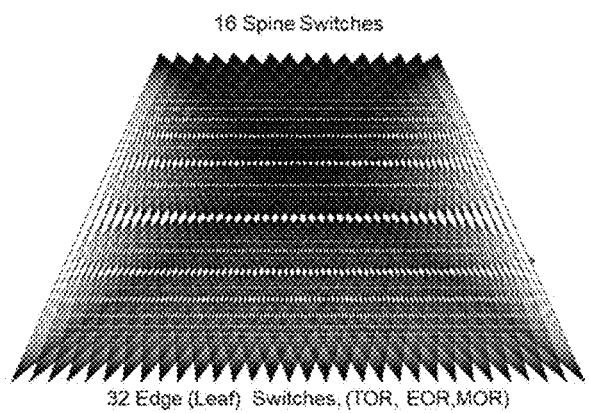 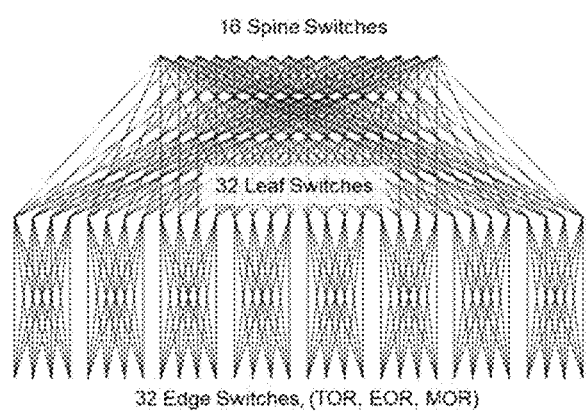
FIG. 1(A) Two-level FCN radix 32  FIG. 1(B) Three-level FCN radix 8

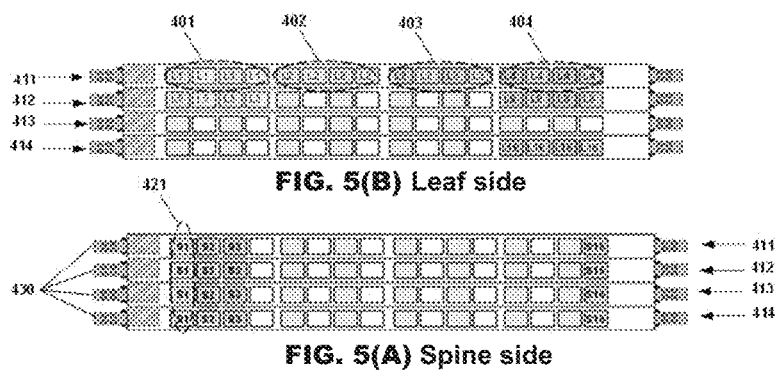
FIG. 5(B) Leaf side
FIG. 5(A) Spine side

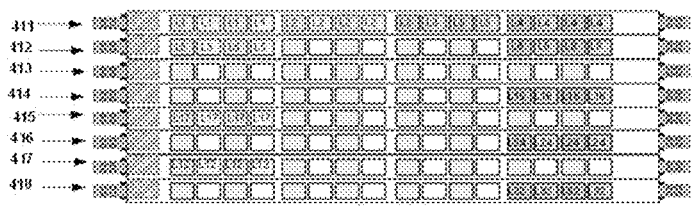
FIG. 6(B) Leaf side
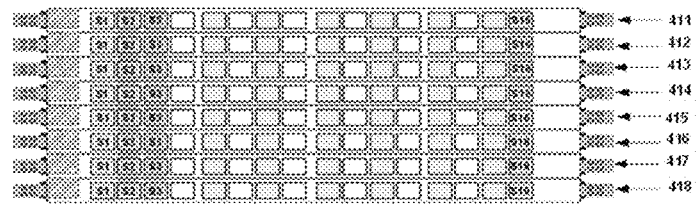
FIG. 6(A) Spine side

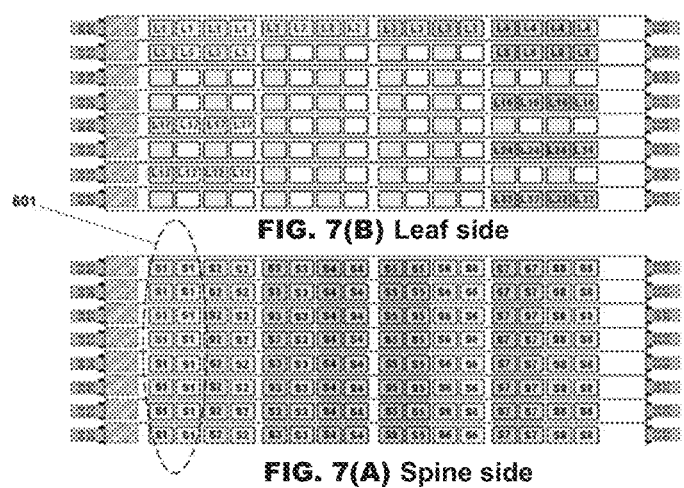
FIG. 7(B) Leaf side
FIG. 7(A) Spine side

OPTICAL INTERCONNECTION MODULE ASSEMBLY FOR SPINE-LEAF NETWORK SCALE-OUT

FIELD OF INVENTION

The present disclosure relates to spine-and-leaf switching networks, and in particular relates to an optical interconnection assembly and method for Spine-and-Leaf network cabling and scale-out, and further relates to Spine-and-Leaf networks that employ optical interconnection assemblies.

BACKGROUND

The use of optical fiber for transmitting communication signals has been rapidly growing in importance due to its high bandwidth, low attenuation, and other distinct advantages, including radiation immunity; small size; and lightweight. Data center architectures using optical fiber are evolving to meet the global traffic demands and the increasing number of users and applications. The rise of cloud data centers, particularly the hyperscale cloud, has significantly changed the enterprise information technology (IT) business structure, network systems, and topologies. Moreover, cloud data center requirements are impacting technology roadmaps and standardization.

The wide adoption of server virtualization and advancements in data processing and storage technologies have produced the growth of East-West traffic within the data center. Traditional three-tier switch architectures comprising Core, Aggregation, and Access (CAA) layers cannot provide the low and equalized latency channels required for East-West traffic. Moreover, since the CAA architecture utilizes spanning tree protocol to disable redundant paths and build a loop-free topology, it underutilizes the network capacity.

The Folded Clos network (FCN) or Spine-and-Leaf architecture is a better-suited topology to overcome the limitation of the three-tier CAA networks. A Clos network, a multilevel circuit switching network introduced by Charles Clos in 1953, has become very relevant today due to the use of complex optical interconnect topologies. The Folded-Clos network topology utilizes two types of switch nodes, Spine and Leaf. Each Spine is connected to each Leaf. The network can scale horizontally to enable communication between a large number of servers while minimizing the latency and non-uniformity by simply adding more Spine and Leaf switches.

FIGS. 1A and 1B. show an example of two FCNs with a similar number of hosts, using different radixes and levels. The higher radix, 32 in this example, connects 32 edge switches in a two-layer network, as shown in FIG. 1A. The two-level FCN provides the lowest latency at the cost of requiring a denser network (512 interconnections). By using a three-layer network, the interconnection layout simplifies (256 interconnections). However, more switches are needed, and more latency is introduced in the network. During the last years, the need for flatter networks to address the growing traffic among machines has favored the radix increase of the switches' application-specific integrated circuits (ASICs). Currently, switch ASIC radixes can handle 256 ports at a speed of 100 Gb/s per port. ASICs with higher radixes are expected in the future.

Based on industry telecommunications infrastructure Standard TIA-942-A, the locations of leaf and spine switches can be separated by tens or hundreds of meters. Typically, Spine switches are located in the main distribution area (MDA), whereas Leaf switches are located in the equipment distribution area (EDA) or horizontal distribution area (HDA).

This architecture has been proven to deliver high-bandwidth and low latency (only two hops to reach the destination), providing low oversubscription connectivity. However, for large numbers of switches, the Spine-Leaf architecture requires a complex mesh with large numbers of fibers and connectors, which increases the cost and complexity of the installation.

Future data centers will require more flexible and adaptable networks than the traditional mesh currently implemented to accommodate highly distributed computing, machine learning (ML) training loads, high levels of virtualization, and data replication.

Traditionally the mesh fabrics such as the ones shown in FIGS. 1A and 1B have been implemented over patch panels using hundreds or thousands of patch cords connections to deploy the network topology. More recently, the use of transpose boxes as shown in prior art, can help to deploy those networks while reducing installation errors. Transposed boxes implement a section of the network mesh inside a box using multiple duplex fiber connections or optical flex circuits. The utilization or more recent BiDi optical components and simplex cabling is advantageous since it increases port density while decreasing routing density. Hence, a better way to implement the meshes is to use simplex Bi-directional (BiDi) communications to implement today's complex mesh topologies.

SUMMARY

An optical interconnection assembly for optically connecting up to 16 Spine switches to one or more Leaf switches in a Spine-and-Leaf (S/L) network has an array of simplex fiber optic cables, a plurality of Leaf multi-fiber connector (MFC components, and a plurality of Spine MFC components. Each of the simplex fiber optic cables has a first end and a second end and each simplex optical fiber cable forms a parallel optics channel having an aggregate data rate four times that of any single simplex optical fiber in a parallel optics channel. The plurality of Leaf multi-fiber connector (MFC) components each optically connects to the first ends of certain ones of the simplex fiber optic cables and provides four data communication lanes in a parallel optics channel and a bandwidth four times that of any one lane in a parallel optics channel. The plurality of Spine MFC components each optically connects to the second ends of certain ones of the simplex fiber optic cables and each spine MFC component provides four parallel channels and a bandwidth four times that of any one optical lane.

BRIEF DESCRIPTION OF THE FIGURES

FIG. 1A shows a two-level FCN with a radix of 32.

FIG. 1B shows a three level FCN with a radix of 8.

FIG. 5A shows how Spine switch MFC uplinks are populated vertically.

FIG. 5B shows how Leaf switch MFC uplinks should remain grouped together.

FIG. 6A shows how the rules set forth can be applied to double the number Spine switch MFC uplinks.

FIG. 6B shows how the rules set forth in FIGS. 5A and B can be applied to double the number of Leaf switch MFC uplinks.

FIG. 7A shows the spine side of a network with eight spine switches according to the present invention.

FIG. 7B shows the leaf side of a network with eight spine switches.

DESCRIPTION OF INVENTION

Reference is now made in detail to one generic embodiment of the disclosure, examples of which are illustrated in the accompanying drawings. The drawings are not to scale, and one skilled in the art will recognize where the drawings have been simplified to illustrate the key aspects of the disclosure.

The claims as set forth below are incorporated into and constitute part of this detailed description. The entire disclosure of any publication or patent document mentioned herein is incorporated by reference. The term "fiber" or "optical fiber" is used herein to mean single-mode optical fiber (SMF) or multimode optical fiber (MMF) unless the context indicates otherwise which form fiber optic cables. The fiber optic cables may have multiple optical fibers, as a non-limited example, fiber optic cable may have one optical fiber to form a simplex fiber optic cable. The term "connector" is used herein to mean a device for terminating one or more optical fibers. The term "adapter" is used herein to mean a device that serves to operably connect two connectors. The term "multi-fiber connector" is abbreviated as "MFC" and refers to an element or elements for connecting multiple fibers and can include, without limitation, any one or combination of connector, adapter, splice, receptacle, port, and the like, such that the fibers may be optically and operably connected.

Figure 2:
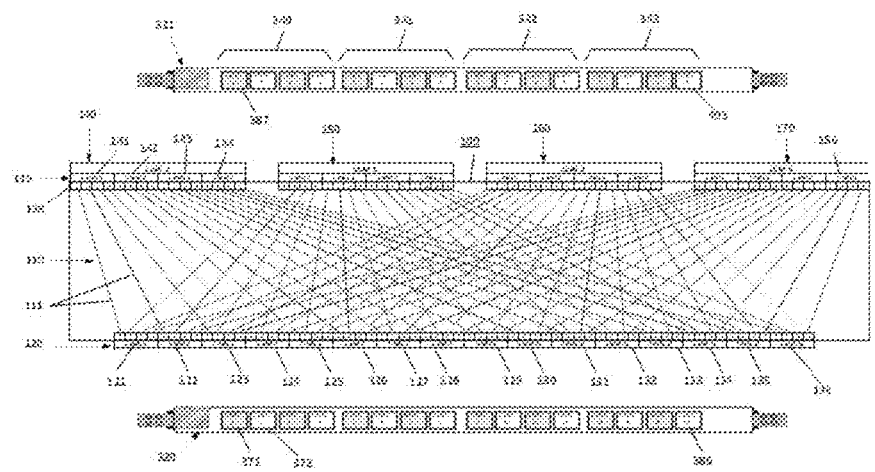
FIG. 2 shows an exemplary optical network interconnection module (NIM) according to the present invention.

An exemplary optical Network Interconnection Module 100 and method thereof is illustrated in FIG. 2 and includes a fiber array 110 constituted by optical fibers 111. Optical fibers 111 connect certain spine-side MFCs 120 and leaf side MFCs 139, located in this example on each side of disclosed module 100. The optical fibers 110 in this exemplary module configuration, are cross-connected as denoted in Table 1 and are discussed below.

The optical interconnection assembly 100 of FIG. 2 has 16 Spine-side MFC components 120 and these are denoted S-MFC 1 121 through S-MFC 16 136 and are accessible via optical adapters 371 through 386 located on exemplary front panel 321. Similarly, there are sixteen Leaf-side MFCs where to better understand the optical fiber cross-connection configuration, are arranged into four Leaf-side L-MFC component groups 140, 150, 160, and 170. Each component group includes four MFCs denoted L-MFC 1 through L-MFC 4 and where, each MFC contains four simplex optical fibers (denoted 1 through 4) 138. The Leaf-side MFCs are accessible via optical adapters 387 through 403 (adapters 388 through 402 not denoted) located on rear panel 321.

The disclosed fiber routing method and interconnection module provides optimum Spine-and-Leaf connectivity, data load balancing, and enables network scale-out from one to more than 100,000 network servers by adding additional modules and rearranging module patch cord connections as the network grows. The disclosed optical fiber routing method is listed in TABLE 1, and as shown in FIG. 2.

Each group of 16 optical fibers within each MFC component group 140 are sequentially distributed to each of the 16 S-MFCs and the optical fibers from adjacent MFC component groups are interleaved with each S-MFC. As a result of the interleaving, this improved method of S/L interconnection provides data load balancing from each MFC by distributing each optical fiber L-MFC 1 through L-MFC 4 across multiple Spine switch MFCs.

TABLE 1

| LEAF | MFC | FIBER | SPINE | MPO | FIBER |
|---|---|---|---|---|---|
| 1 | 1 | 1 | 1 | 1 | 1 |
|   |   | 2 | 2 | 1 | 1 |
|   |   | 3 | 3 | 1 | 1 |
|   |   | 4 | 4 | 1 | 1 |
|   | 2 | 1 | 5 | 1 | 1 |
|   |   | 2 | 6 | 1 | 1 |
|   |   | 3 | 7 | 1 | 1 |
|   |   | 4 | 8 | 1 | 1 |
|   | 3 | 1 | 9 | 1 | 1 |
|   |   | 2 | 10 | 1 | 1 |
|   |   | 3 | 11 | 1 | 1 |
|   |   | 4 | 12 | 1 | 1 |
|   | 4 | 1 | 13 | 1 | 1 |
|   |   | 2 | 14 | 1 | 1 |
|   |   | 3 | 15 | 1 | 1 |
|   |   | 4 | 16 | 1 | 1 |
| 2 | 1 | 1 | 1 | 1 | 2 |
|   |   | 2 | 2 | 1 | 2 |
|   |   | 3 | 3 | 1 | 2 |
|   |   | 4 | 4 | 1 | 2 |
|   | 2 | 1 | 5 | 1 | 2 |
|   |   | 2 | 6 | 1 | 2 |
|   |   | 3 | 7 | 1 | 2 |
|   |   | 4 | 8 | 1 | 2 |
|   | 3 | 1 | 9 | 1 | 2 |
|   |   | 2 | 10 | 1 | 2 |
|   |   | 3 | 11 | 1 | 2 |
|   |   | 4 | 12 | 1 | 2 |
|   | 4 | 1 | 13 | 1 | 2 |
|   |   | 2 | 14 | 1 | 2 |
|   |   | 3 | 15 | 1 | 2 |
|   |   | 4 | 16 | 1 | 2 |
| 3 | 1 | 1 | 1 | 1 | 3 |
|   |   | 2 | 2 | 1 | 3 |
|   |   | 3 | 3 | 1 | 3 |
|   |   | 4 | 4 | 1 | 3 |
|   | 2 | 1 | 5 | 1 | 3 |
|   |   | 2 | 6 | 1 | 3 |
|   |   | 3 | 7 | 1 | 3 |
|   |   | 4 | 8 | 1 | 3 |
|   | 3 | 1 | 9 | 1 | 3 |
|   |   | 2 | 10 | 1 | 3 |
|   |   | 3 | 11 | 1 | 3 |
|   |   | 4 | 12 | 1 | 3 |
|   | 4 | 1 | 13 | 1 | 3 |
|   |   | 2 | 14 | 1 | 3 |
|   |   | 3 | 15 | 1 | 3 |
|   |   | 4 | 16 | 1 | 3 |
| 4 | 1 | 1 | 1 | 1 | 4 |
|   |   | 2 | 2 | 1 | 4 |
|   |   | 3 | 3 | 1 | 4 |
|   |   | 4 | 4 | 1 | 4 |
|   | 2 | 1 | 5 | 1 | 4 |
|   |   | 2 | 6 | 1 | 4 |

TABLE 1-continued

| LEAF | MFC | FIBER | SPINE | MPO | FIBER |
|------|-----|-------|-------|-----|-------|
|      |     | 3     | 7     | 1   | 4     |
|      |     | 4     | 8     | 1   | 4     |
|      | 3   | 1     | 9     | 1   | 4     |
|      |     | 2     | 10    | 1   | 4     |
|      |     | 3     | 11    | 1   | 4     |
|      |     | 4     | 12    | 1   | 4     |
|      | 4   | 1     | 13    | 1   | 4     |
|      |     | 2     | 14    | 1   | 4     |
|      |     | 3     | 15    | 1   | 4     |
|      |     | 4     | 16    | 1   | 4     |

Figure 3:
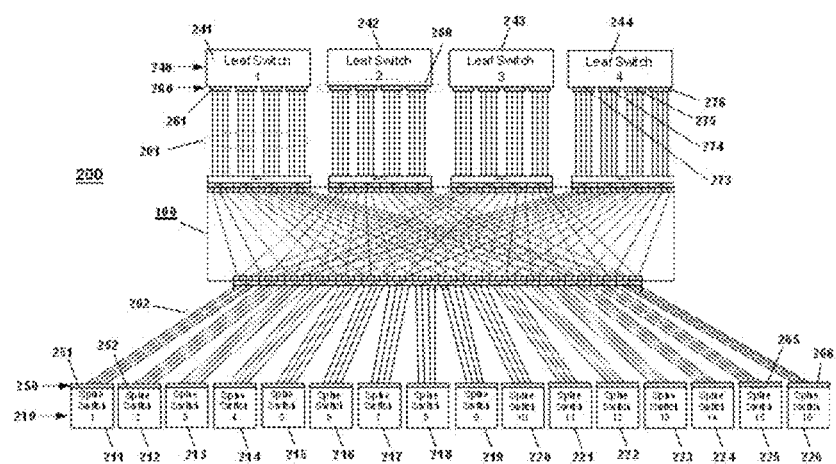
FIG. 3 is a schematic diagram of an exemplary Spine-and-Leaf (S/L) network that includes 16 spine switches using the NIM of FIG. 2.

FIG. 3 is a schematic diagram of an exemplary Spine-and-Leaf (S/L) network 200 that includes 16 spine switches 210 denoted 211 through 226- and four-leaf switches 240, denoted 241 through 244, interconnected via module 100. In the present embodiment, each Leaf switch has four MFC components with four simplex optical fiber uplinks per MFC (total of sixteen uplink fiber channels per Leaf switch). Based on the number of Leaf switch server ports, this module configuration can be used to scale out a network from one to more than 100,000 network servers by simply adding additional modules as will be shown below. Given forty-eight port Leaf switches with a 3:1 oversubscription, and sixteen Spine switches, the installation of 200 network interconnect modules 100 can interconnect 98,304 servers (Table 1).

In the S/L network 200 of FIG. 3, Spine switches 210 and leaf switches 240 are interconnected through one Network Interconnection Module (NIM) 100. In this example, NIM 100 interconnects four Leaf switches to sixteen Spine switches via MFCs L-MFC 261 through 276 (252 through 272 not denoted) and S-MFC 251 through 266 respectively (S-MFC 253 through 264 are not denoted). A primary feature of the disclosed NIM 100 is that module 100 forms an elementary building block capable of scaling out networks to interconnect tens, hundreds or thousands of servers. Moreover, Spine switches 210 can be interconnected with hundreds, or thousands, of Leaf switches 240 that each has tens of Leaf MFC components 260. Likewise, S/L networks 200 may utilize tens or hundreds of optical interconnection module 100 to create the required S/L connectivity with the additional function of load balancing by way of the break-out of parallel optical fiber lanes and implementing channel interlacing.

As shown in FIG. 3, each Spine switch 210 has a Spine MFC component 250, denoted 251 through 266 (252 through 255 not denoted) while each Leaf switch has Leaf MFC components 260, denoted 261 through 276 (262 through 272 not denoted). In the present embodiment, each Spine switch 210 has a MFC component 250 terminating four optical fibers 202, namely, Spine MFC components 251 through 266 (253 through 264 not denoted), and each Leaf switch 240 has four 4-fiber MFCs, denoted 273 through 276 as shown for Leaf switch 244.

Figure 4A:
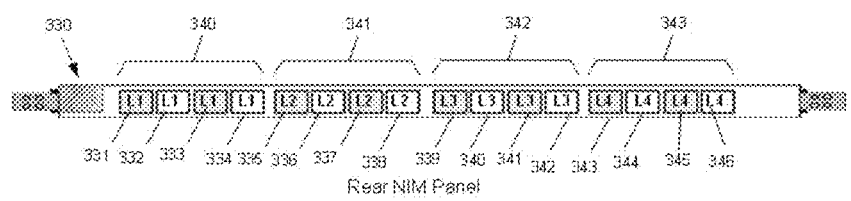
FIG. 4A shows a front face of the exemplary NIM of FIG. 2.
Figure 4B:
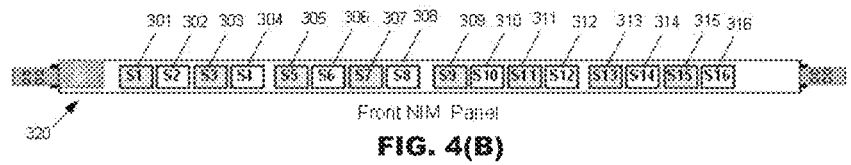
FIG. 4B shows a rear face of the exemplary NIM of FIG. 2.

The method for network scale-out is best understood by considering an exemplary view of the NIM front and rear faceplate images shown in FIGS. 4A and 4B. The sixteen Spine MFC components 121 through 136 (FIGS. 1A and 1B) are accessed via MFC adapters 301 through 316 and are shown positioned horizontally across the exemplary module faceplate 320. For clarity, the sixteen Spine adapters are labeled S1 through S16 indicating the Spine switch cable connections. The Leaf switch MFC components are grouped into four sets 340 through 343 of four MFCs where each MFC terminates four optical fibers. For clarity, each Leaf MFC adapter groups 340 through 343 are labeled L1 through L4 respectively, indicating the Leaf switch cable connections.

The disclosed Network Interconnect Module 100 is uniquely designed to simplify the scale-out process by following a two basic rules as illustrated in FIGS. 5A and 5B; (1) Leaf switch MFC uplinks remain grouped together and connect to one of four adapters MFC component groups 401 through 404, and the Leaf switch uplinks are populated horizontally and sequentially from left to right as NIM are added as shown in FIG. 5B, and (2) Spine switch MFC uplinks are populated vertically in columns of NIMs 421 and must maintain the same relative vertical column position.

As the network grows and NIMs are added, the disclosed method provides a simple, quick, systematic, and error-free methodology for connecting networks or for implementing adds, moves, or changes. To scale-out a network, all that is require is to add the necessary number of NIMs in sets of four and follow the connection methodology described above (the two basic rules).

Following the two basic rules, the above exemplary network can be doubled in size by adding four additional NIMs 415 through 418, as shown in FIGS. 6A and 6B. In this scenario, the network comprises 32 Leaf switches and 16 Spine switches, enabling the S/L interconnection with load balancing for 1536 network servers.

The maximum number of connected network servers depends on the number of Leaf switch server ports and the oversubscription. For a Leaf switch having 48 ports, and an oversubscription of 3:1, each Leaf switch connects 36 Server ports, and the remaining 16 optical fiber uplinks are routed to Spine switches via NIM 100. For a network having 16 Spine switches, the disclosed module will support the network configurations listed in Table 2.

TABLE 2

| # Spine Swtches | # Leaf Switches | # Servers | # NIMs | Rack Space for Modules, (RU) | # Racks for modules |
|---|---|---|---|---|---|
| 16 | 16 | 768 | 4 | 2 | 1 |
| 16 | 32 | 1536 | 8 | 3 | 1 |
| 16 | 48 | 2304 | 12 | 5 | 1 |
| 16 | 64 | 3072 | 16 | 6 | 1 |
| 16 | 72 | 3456 | 18 | 7 | 1 |
| 16 | 96 | 4608 | 24 | 9 | 1 |
| 16 | 128 | 6144 | 32 | 12 | 1 |
| 16 | 192 | 9216 | 48 | 17 | 1 |
| 16 | 256 | 12288 | 64 | 23 | 1 |
| 16 | 384 | 18432 | 96 | 34 | 1 |
| 16 | 512 | 24576 | 128 | 45 | 2 |
| 16 | 768 | 36864 | 192 | 68 | 2 |
| 16 | 1024 | 49152 | 256 | 90 | 3 |
| 16 | 1536 | 73728 | 384 | 135 | 4 |
| 16 | 2048 | 98304 | 512 | 180 | 5 |

The aggregated data rates per module are estimated using, $D_a = 2 \times N_f \times N_c \times D$, where $N_f$ is the number of fibers used per connector, $N_c$, is the number of connectors in module 100, e.g., $N_c=16$, D is the data rate per fiber in one direction. The factor 2 is used in this exemplary network to take into account networks utilizing Bi-directional communication. For example, assuming that four fibers per connector is used, $N_f=4$, $D_a=12.8$ Tbps assuming transceivers operating with D=100 Gbps/wavelength, and $D_a=25.6$ Tbps assuming D=200 Gbps/wavelength. Assuming that three NIMs can fit in one RU, this produces a density of 76.8 Tbps per RU of mesh connectivity between switches. A rack of fifty RU containing modules 100 can potentially provide up to four Pbps of mesh connectivity.

Figures 8A, 8B:
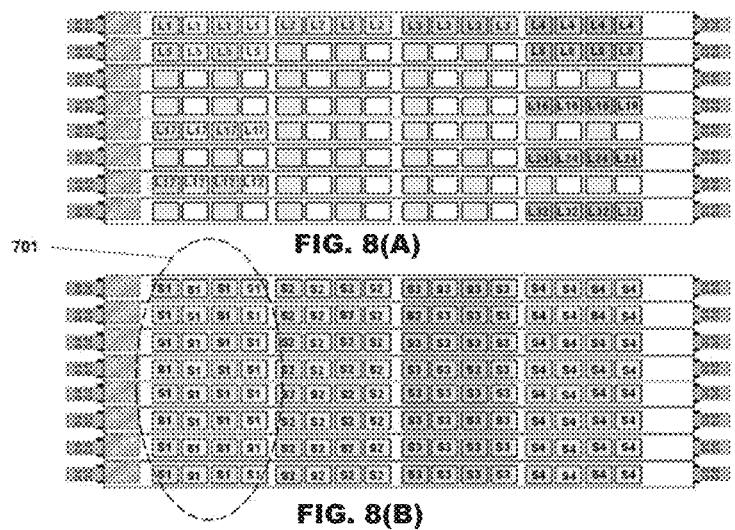
FIG. 8A shows the spine side of a network with four spine switches according to the present invention.
FIG. 8B shows the leaf side of a network with four spine switches according to the present invention.

The disclosed network interconnect module 100 can also be used to build and scale-out networks having eight or four Spine switches following the same two basic rules as described above. For eight or four Spine switches, rule two states "Spine switch MFC uplinks are populated vertically in columns of NIMs 421 (FIGS. 5A and 5B) and must maintain the same relative vertical column position." For eight spines the sixteen MFC Spine uplinks roll over to occupy two consecutive columns 601 instead of one, as shown in FIGS. 7A and 7B. Similarly, for a network having four Spine switches, the Spine MFC uplinks occupy four consecutive columns 701 as shown in FIGS. 8A and 8B.

Figure 9:
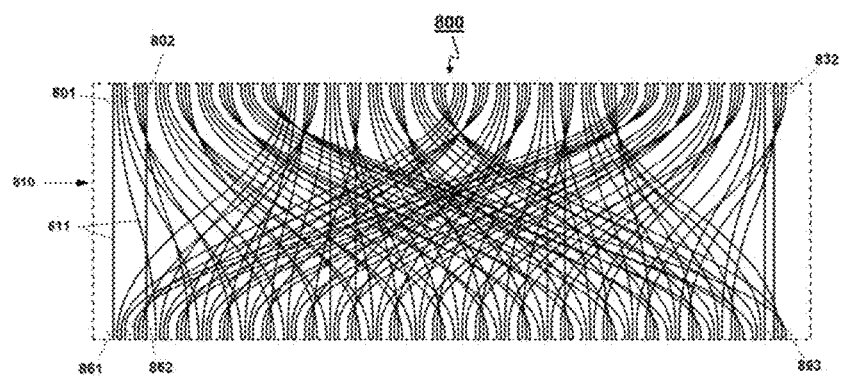
FIG. 9 shows how the NIM module of FIG. 2 can be extended to eight optical fiber MFC components instead of four.

The disclosed Spine-and-Leaf network interconnect module 100 can be extended to eight optical fiber MFC components instead of four, as shown in FIG. 9. In this configuration, module 810 can contain eight simplex optical fibers per Spine and Leaf MFC components, enabling two times the number of simplex optical fibers.

Figure 10:
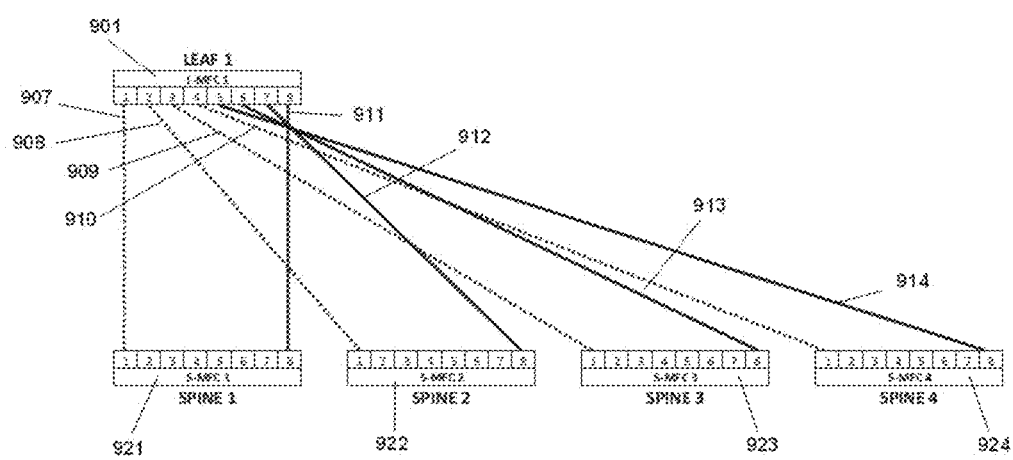
FIG. 10 shows the distribution and interleaving of the first eight fibers in Leaf switch MFC.

Alternatively, doubling the number of simplex optical fibers utilizing eight fiber MFC components in module 810, the module can be modified to support duplex network communications with no trade-off in installation method or scale-out. FIG. 10, shows the distribution and interleaving of the first eight fibers in Leaf switch MFC 901, which according to the present invention is routed to the first four Spine MFC components 921 through 924. However, in this module configuration, the order of the additional four fibers 911 through 914 occupying fiber positions 5 through 8 in L-MFC 1 of Leaf MFC component group 901 are reversed. In this embodiment, the interleaving order of simplex optical fibers 911 through 914 are reverse relative to the fiber distribution of L-MFC fiber 1 through 4, 907 through 910 respectively. This interleaving order can be expressed in a mathematical form that relates the index of the fibers connecting leaf and Spine switches as shown below, $$S = 4(M_L - 1) + (9 - F_L)$$

$$Fs = 8 - L$$

In this expression, S represents the module ports that connect to the Spine switches, and $F_S$ is the fiber index in the MFC port. These fibers connect to the fibers, $F_L$ from the MFC ports, $M_L$ of the Leaf switches, L.

What is claimed is:

1. An optical interconnection assembly for optically connecting up to 16 Spine switches to one or more Leaf switches in a Spine-and-Leaf (S/L) network, comprising:
    an array of simplex fiber optic cables, wherein each of the simplex fiber optic cables has a first end and a second end, and wherein each simplex optical fiber cable forms a parallel optics channel having an aggregate data rate four times that of any single simplex optical fiber in a parallel optics channel;
    a plurality of Leaf multi-fiber connector (MFC) components, wherein each of the Leaf MFC components optically connects to the first ends of certain ones of the simplex fiber optic cables, and wherein each Leaf MFC component provides four data communication lanes in a parallel optics channel and a bandwidth four times that of any one lane in a parallel optics channel;
    a plurality of Spine MFC components, wherein each of the Spine MFC components optically connects to the second ends of certain ones of the simplex fiber optic cables, and wherein each spine MFC component provides four parallel channels and a bandwidth four times that of any one optical lane; and
    where the optical interconnection assembly enables network data Load Balancing.

2. The optical interconnection assembly according to claim 1, further including a housing having an interior that contains the array of simplex fiber optic cables.

3. The optical interconnection assembly according to claim 2, wherein the housing comprises a modular housing having a first side that supports the plurality of spine MFC components and a second side that supports the plurality of leaf MFC components.

4. The optical interconnection assembly according to claim 1, wherein each of the Spine MFC components has an aggregate data rate and wherein each of the MFC components are utilized for parallel optics where a single Lane data rate is equal to 25% of the aggregate data rate.

5. The optical interconnection assembly according to claim 1, wherein:
    the aggregate data rate is 400 Gb/s and the second data rate is 100 Gb/s; or
    the aggregate data rate is 200 Gb/s and the parallel fiber lane data rate is 50 Gb/s; or
    the aggregate data rate is 100 Gb/s and the parallel fiber lane data rate is 25 Gb/s.

6. The optical interconnection assembly according to claim 4, wherein the Leaf MFC components transmit the same data rate as the Spine MFC components.

7. The optical interconnection assembly according to claim 1, capable of providing a mesh density up to 384 D per RU, where D is the data rate per wavelength, enabling up to 76.8 Tbps/RU and up to 4 Pbps per rack.

8. A network interconnect module according to claim 1, having eight fibers per MFC.

9. A method according to claim 8, where the order of simplex optical fibers 5 through 8 are interlaced in reversed order.

10. A Spine-and-Leaf (S/L) network having scale-out capability that contains an array of optical fiber connections, comprising one or more Spine switches, each having one or more Spine MFC components, one or more Leaf switches, each having one or more Leaf MFC components, at least one optical interconnection assembly having a first plurality of Spine MFC components optically connected to the one or more Spine MFC components via one or more Spine patch cords, and having a second plurality of Leaf-side MFC components optically connected to the one or more leaf MFC components via one or more Leaf patch cords, and at least one optical network interconnection module assembly further comprising an array of simplex fiber optic cables that optically connect at least one Spine MFC component of each Spine switch to at least one Leaf MFC component of each Leaf switch so that every Spine switch is optically connected to every Leaf switch; wherein each spine-side MFC component has four parallel lanes of a parallel optics channel and an aggregate data rate, each Leaf-side MFC component has at least one parallel optics channel lane and where each simplex optical fiber has a data rate one-fourth that of the MFC component aggregate data rate.

11. The S/L network according to claim 10, wherein the data communications bandwidth of the sum of all Leaf-side MFC component uplinks equals the sum of all Spine-side MFC component uplink data communications bandwidth.

12. The S/L network according to claim 10, further includes a housing having an interior that contains the array of simplex optical fibers.

13. The S/L network according to claim 12, wherein the housing comprises a modular housing having a first side than supports the plurality of Spine MFC components and a second side that supports the plurality of leaf MFC components.

14. The S/L network according to claim 12, wherein the housing comprises a modular housing wherein both Spine MFC components and Leaf MFC components are accessible on one side of the modular housing.

15. The S/L network according to claim 10, wherein each of the Spine MFC components has an aggregate data equal to that of each of the Leaf MFC components aggregate data rate.

16. The S/L network according to claim 10 wherein:
 (a) the aggregate data rate of the 4 parallel optics data communication lanes is 100 Gb/s; or;
 (b) the aggregate data rate of the 4 parallel optics data communication lanes is 200 Gb/s; or
 (c) the aggregate data rate of the 4 parallel optics data communication lanes is 400 Gb/s; or
 (d) the aggregate data rate of the 4 parallel optics data communication lanes is 800 Gb/s.

17. A method of forming a Spine-and-Leaf (S/L) network using a plurality of Spine switches and a plurality of Leaf switches, comprising:
 providing at least one optical interconnection assembly having a plurality of Spine MFC components and a plurality of Leaf MFC components, wherein each Spine MFC component is optically connected to each Leaf MFC component via an array of simplex fiber optic cables;
 optically connecting each of the plurality of Spine switches to one or more of the Spine MFC components of the at least one network interconnection module;
 optically connecting each of the plurality of Leaf switches to one or more of the Leaf MFC components of at least one network interconnection module so that each Leaf switch is optically connected to each Spine switch through the at least one Network interconnection module, wherein each Spine MFC component has four parallel optics channel lanes and an aggregate bandwidth, each Leaf MF component also contain parallel channel lanes having the same aggregate bandwidth, and each simplex fiber optic cable has a data rate is 25% of the aggregate data rate.

18. The method according to claim 17, wherein said optically connecting the plurality of Spine switches to the one or more of the Spine MFC components of the at least one network interconnection module is performed using a first plurality of Spine patch cords in a first configuration, and further comprising:
 adding one or more Spine switches to the S/L network by adding a second plurality of Spine patch cords and rearranging the first plurality of patch cords to define a second configuration.

19. The method according to claim 17, further comprising scaling out the S/L network by operably adding network interconnect modules to the S/L network.

* * * * *